United States Patent [19]

Honda et al.

[11] Patent Number: 4,678,054

[45] Date of Patent: Jul. 7, 1987

[54] BODY FRAMES

[75] Inventors: Kazuo Honda, Yokohama; Yoshiaki Horii, Niiza; Kinuo Hiramatsu, Wako; Shuhei Nakamoto, Yono; Takashi Kudo, Shiki, all of Japan

[73] Assignee: Honda Giken Kogyo Kabushiki Kaisha, Tokyo, Japan

[21] Appl. No.: 813,281

[22] Filed: Dec. 24, 1985

[30] Foreign Application Priority Data

Dec. 26, 1984 [JP] Japan .............................. 59-196041[U]
Mar. 6, 1985 [JP] Japan .............................. 60-31964[U]
Mar. 19, 1985 [JP] Japan .................................. 60-55098
Mar. 19, 1985 [JP] Japan .................................. 60-55100

[51] Int. Cl.[4] ...................... B62K 11/08; B62K 19/30
[52] U.S. Cl. .................................... 180/225; 180/219; 180/296
[58] Field of Search ...................... 180/225, 219, 296; 280/281 R

[56] References Cited

U.S. PATENT DOCUMENTS

| 1,015,418 | 1/1912 | Breed | 180/225 |
| 4,321,978 | 3/1982 | Tominaga et al. | 180/225 |
| 4,323,135 | 4/1982 | Tominaga et al. | 180/228 |
| 4,585,086 | 4/1986 | Hiramatsu | 180/219 |
| 4,585,246 | 4/1986 | Diekman et al. | 280/281 R |

FOREIGN PATENT DOCUMENTS

| 2843020 | 4/1980 | Fed. Rep. of Germany | 180/219 |
| 2252946 | 6/1975 | France | 180/219 |
| 16942 | 4/1916 | United Kingdom | 180/225 |

Primary Examiner—John J. Love
Assistant Examiner—Dann McGiehan
Attorney, Agent, or Firm—Armstrong, Nikaido, Marmelstein & Kubovcik

[57] ABSTRACT

For at least a portion of a body frame, a pipe member is used, which includes therein a longitudinal partition wall for defining passages. The pipe member is provided with an inlet and an outlet to be in communication with the passages. A plurality of passages defined in the pipe member are used for various purposes including cable insertion passages, engine breeder passages or air feeding passages.

12 Claims, 23 Drawing Figures

BODY FRAMES

FIELD OF THE INVENTION AND RELATED ART STATEMENT

The present invention relates to a body frame and, more particularly, to a body frame best-suited for use with saddle type vehicles such as automatic two- or three-wheeled vehicles.

Heretofore, the body of an automatic two- or three-wheeled vehicle has generally been made of frame members such as closed types of pipes of a round or rectangular shape in section.

According to prior art arrangement, however, mechanical parts such as engines, brakes and various operating levers and wiring and piping members for making connections between function parts such as headlights, other electrical parts and various switches are clipped or otherwise fixed in place along said frame members. For that reason, the wiring and piping members are often exposed to open view, thus offering an appearence problem.

The engine includes a breather so as to adjust the pressure prevailing in the crank chamber. To this end, a breather chamber of the labyrinthine design has been attached to the engine per se; however, this has led to a substantial reduction in the volume thereof. Object and Summary of the Invention With that background in mind, the present invention is characterized in that a body frame is provided, at least a portion of which is formed of a pipe member including therein a longitudinally extending partition wall for defining a plurality of passages, the pipe member being provided with an inlet and an outlet to be in communication with the passages.

With such an arrangement, it is possible to use the passages defined in the pipe member for a number of purposes. More specifically, a primary object of the present invention is to insert cables such as control cables and wire harness through one passage to provide simplified wiring of the cables.

Another object of the present invention is to increase the length of a breather chamber by using the interior of one passage of the pipe member as the breather chamber of an engine, thereby achieving improved gas-liquid separation of an exhaust or discharged gas.

A further object of the present invention is to use a plurality of passages defined in the pipe member for different functions, i.e., for feeding air to a carburettor, for inserting various cables, for a breather chamber for an exhaust gas and for other purposes, thereby facilitating mounting of various parts such as fuel tanks and electrical parts and enhancing the degree of freedom in the body design.

BRIEF DESCRIPTION OF THE DRAWINGS

FIG. 1 being a side view, partly cut-away, of an automatic two-wheeled vehicle or motorcycle, FIG. 2 being a perspective view of a body frame and FIG. 3 being a sectional view taken along the line III—III of FIG. 1.

FIG. 4 being a side view of a body frame of a motorcycle,

FIG. 5 being a plan view of that frame,

FIG. 6 being a sectional view taken along the line 6—6 of FIG. 4 and

FIGS. 7 to 13 being sectional views of modifications of that frame.

FIG. 14 being a side view of the front portion of a body frame of a motorcycle,

FIG. 15 being a sectional view taken along the line 15—15 of FIG. 14,

FIG. 16 being a side view of a modification to which an oil return function is added, FIG. 17 being a side view of another modification, FIG. 18 being a sectional view taken along the line 18—18 of FIG. 17, FIG. 19 being a perspective view of a further modification wherein a pair of main pipes are allowed to communicate with each other by means of a cross-pipe, and FIG. 20 being a plan view of that further modification.

FIG. 21 being a perspective view of a body frame of a motorcycle,

FIG. 22 being a sectional view of a body frame, and

FIG. 23 being a sectional view of a modified body frame.

DETAILED DESCRIPTION OF THE PREFERRED EMBODIMENTS

The first embodiment of the present invention will now be explained with reference to FIGS. 1 and 3.

Figure 1:
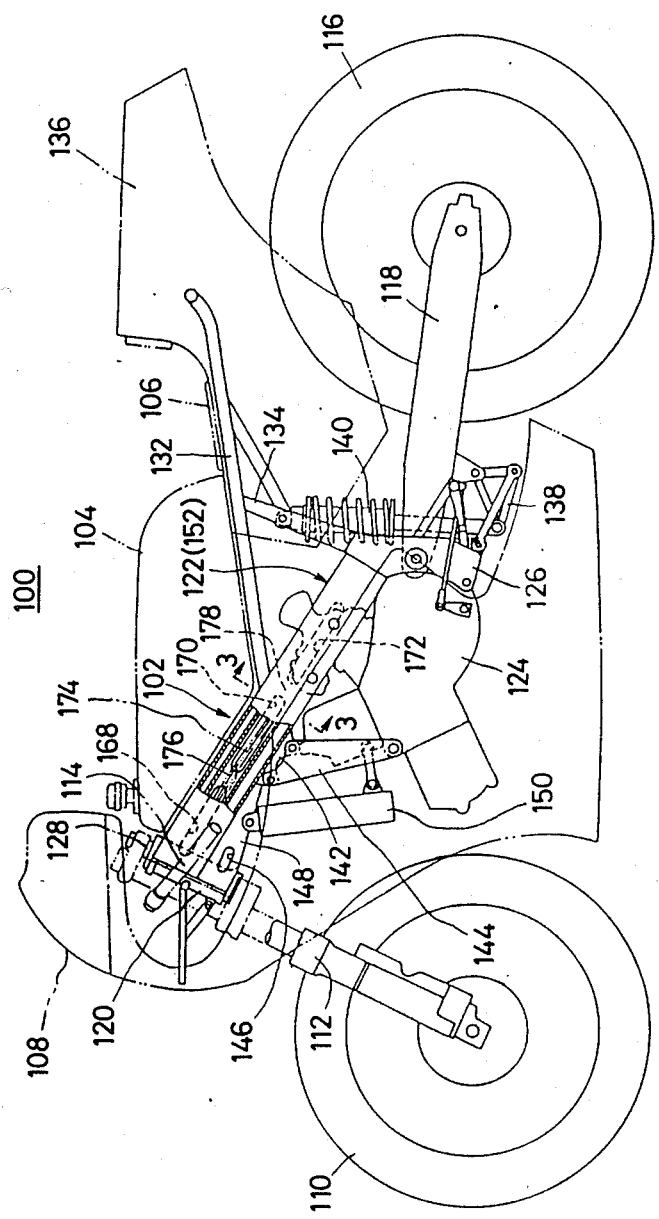
FIGS. 1 to 3 show together the first embodiment of the present invention.
Figure 2:
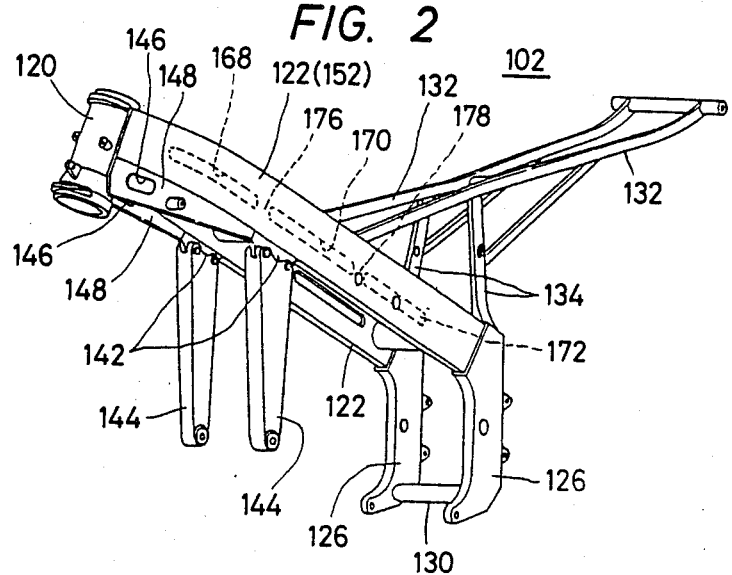

FIG. 1 is a side veiw, partly cut-away, of a motorcycle to which the present invention is applied, and FIG. 2 is a perspective view showing a body frame thereof. The motorcycle generally shown at 100 includes a body frame 102, a fuel tank 104, a seat 106, a cowling 108, a front wheel rotatably supported on the lower portion of a front fork 112, a handlebar 114 fixed to the upper portion of the front fork 112, and a rear wheel 116 rotatably supported on a rear fork 118.

The body frame 102 of the backbone type, and includes a pair of main frames 122 and 122 welded or otherwise fixed to their front ends to a head pipe 120. The pair of main frames 122 and 122, inclining downwardly, pass by the sides of the upper portion of an engine 124 and extend toward the rear portion of the body at a given increasing interval. A pair of pivot plates 126 and 126 are secured at the rear ends of the main frames 112 and 112.

A steering stem 128 of the front fork 112 supporting the front wheel 110 is inserted through the head pipe 120. Between the pivot plates 126 and 126 there is a pivot 130 for pivotally supporting the rear fork 118 supporting the rear wheel 116.

The pair of main frames 122 and 122 are connected substantially at the central portions of their upper faces with the front ends of a pair of seat rails 132 and 132 which are supported at their rear ends by seat gusset plates 134 and 134. As illustrated, the fuel tank 104 is mounted on one upper face portion of the seat rails 132 and 132 extending from the front end portions of the frames 112 and 112 to the intermediate portions thereof, and a seat cowl 136 is disposed on the other upper face portion of the seat rails 132 and 132, located rearwardly of the fuel tank 104. Between the pivot plates 126, 126 and the rear fork 118 there is interposed a linkage 138, and between that linkage 138 and the seat gusset plates 134, 134 there is interposed a rear suspension unit 140.

Engine hanger brackets 142 and 142 are mounted substantially on the central undersides of the main frames 122 and 122, and the engine 124 is supportably suspended by engine hangers 144 and 144 connected to the brackets 142 and 142. Head pipe gussets 148 and 148, each having therein an elliptical opening 146, are fixedly provided on the lower portions of the main frames 122 and 122 located between the head pipe 120 and the engine hanger brackets 144, 144. A radiator 150 is then supportably suspended by the head pipe gussets 148, 148 and the engine 124.

Figure 3:
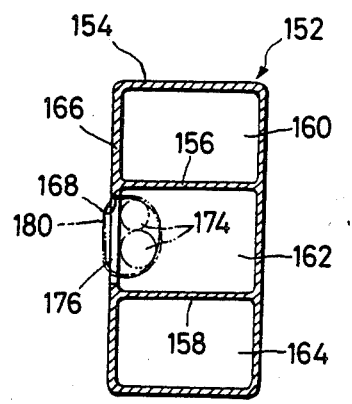

For at least a portion of the body frame 102, for instance, the main frame 122, use may be made of a pipe member 152 of such a shape in secction as illustrated in FIG. 3.

As can be seen from FIG. 3, the pipe member 152 is of the closed section shape with the longitudinal width being longer than the lateral width, and includes partition walls 156 and 158 in parallel with the upper wall 154 and in the longitudinal direction for defining therein passages 160, 162 and 164.

At a position corresponding to a particular passage of one side wall of the pipe member 152, for instance, the intermediate passage 162 of the side wall 166 facing the center of the body, there are provided a successive arrangement of elongated openings 168, 170 and 172. These openings also act as the inlets or outles for cables 174.

The cable 174 such as control cables for an operating lever attached to the handlebar 164 on the front portion of the body wire harness for various lamps and switches are inserted through the oval openings 146 and 146 in the gussets 148 and 148 in between the main frames 122 and 122, and are then inserted into the intermediate passages 162 in the both main frames 122 and 122 through the foremost openings 168 and 168 in the vicinity of the head pipe 120. Then, the cables 174 are clamped by means of a fastener (clamp) 180 to the side wall 176 between the adjacent openings 168 and 170 and the side wall 178 between the adjacent openings 170 and 172, whereby they are arranged on the inside of the side wall 166 of the main frame 122 for wiring. Where units such as a battery are interposed between both main frames 122 and 122, for instance, the cables within the main frame 122, the cables are branched out of any one of the elongated openings 168, 170 and 172 for wiring.

According to the first embodiment of the present invention as mentioned in detail in the foregoing, the cables such as control cables and wire harness are disposed within the passages formed in the pipe member, and are clamped together on the side wall of the pipe member located between a plurality of openings formed therein by means fastener means. Consequently, the cables are protected from outside with no fear of twisting or failure. Unlike the prior art, it is unnecessary to wind a clamp around the outer periphery of the main frames or to provide separately a stay, whereby the time required for wiring is reduced, and improvements are introduced into the design of appearance.

The second embodiment of the present invention will then be explained with reference to FIGS. 4 to 13 inclusive.

Figure 4:
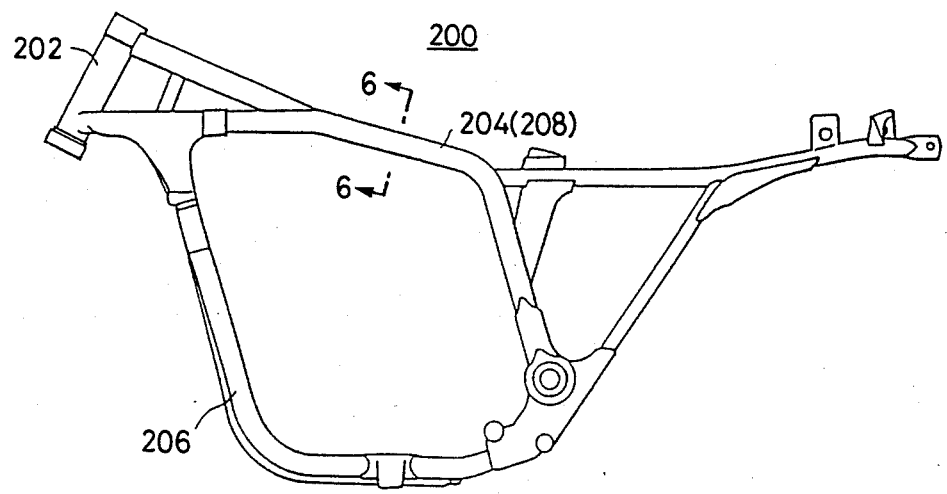
FIGS. 4 to 13 show together the second embodiment of the present invention.
Figure 5:
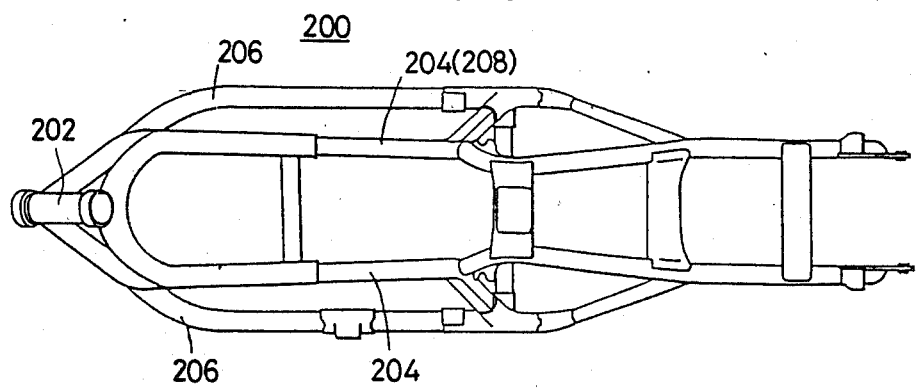

FIG. 4 is a side view of a body frame of a motorcycle, and FIG. 5 is a plan view thereof. A body frame of the double cradle type, shown generally at 200, includes a pair of main frames extending from a front head pipe 202 toward the rear portion of the body frame and a pair of down-tubes 206 and 206 extending downwardly at an angle.

Figure 6:
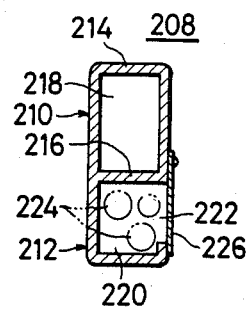

For at least a portion of the frame members forming part of the body frame 200, for instance, the main frame 204, use is made of a pipe member 208 of such a shape in section as illustrated in FIG. 6.

Figure 7:
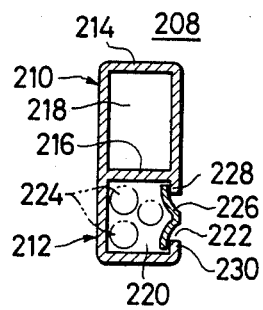
Figure 8:
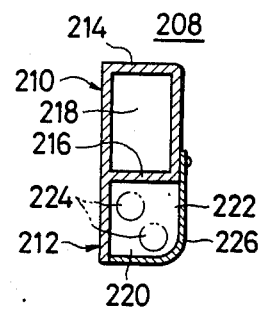
Figure 9:
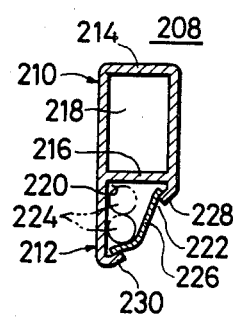
Figure 10:
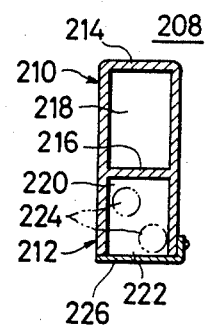
Figure 11:
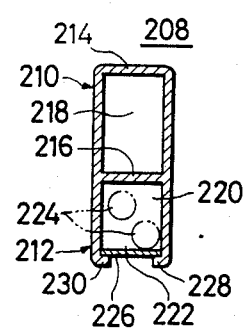

As can be seen from FIG. 6, the pipe member 206 includes an upper portion of the closed section shape and a lower portion of the open section shape contiguous thereto. A partition wall 216 provided in parallel with the member 208 and in the longitudinal direction defines a passage 218 formed of the portion 210 of the closed section shape and a passage 220 formed of the portion 212 of the open section shape. The portion 212 of the open section shape is provided with an opening portion 222 which is open on the side wall, facing the central portion of the body, in the longitudinal direction. Cables 224 such as control cables and wire harness are disposed through the opening portion 222 within the passage 220, and are held in place by means of a plurality of suitable fasteners 226 to the side wall of the portion 210 to face the central portion of the body. FIGS. 7 to 13 each show the pipe member 208 which are of various forms in section. FIG. 7 shows another pipe member including an upper portion of the closed section type and a lower portion of the open section shape, the latter being open at 222, leaving upper and lower lips 228 and 230, on the insides of which a fastener 226 is locked. FIG. 8 illustrates a further modification of the pipe member, wherein a lower portion 212 of the open section shape is open at positions facing the center and lower portion of the body, as indicated by reference numeral 222, and a plastic fastener 226 is locked in place, which extends a distance from the center to the lower portion of the body. As is the case with the embodiment of FIG. 7, said open portion 222 may be provided at both its ends with lips 228 and 230 on which the fastener 226 is locked, as illutrated in FIG. 9. As illustrated in FIG. 10, the lower portion of the open section shape 212 may be open at the lower side indicated at 222, as is the case with the embodiment of FIG. 11, the open portion 222 may also be provided at both its ends with lips 228 and 230 on which the fastener 226 is locked.

Figure 12:
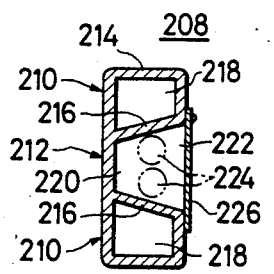
Figure 13:
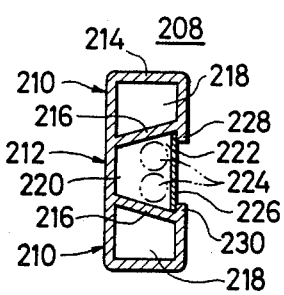

A pipe member 208 illustrated in FIG. 12 includes upper and lower portions 210 of the closed section shape, between which an intermediate portion 212 is interposed. The intermediate portion 212 is open at a position facing the center of the body, as indicated by reference numeral 222. A fastener 226 is locked at one end on the side wall of the upper portion 210 facing the center of the body. As is shown in FIG. 13, the open portion 222 may also be provided at both its ends with lips 228 and 230 on which the fastener 226 is locked.

In the pipe members 208 of the section shape as illustrated in FIGS. 6 to 11, the passage 218 defined by the upper portion 210 of the closed section shape may be used as a breather chamber to be connected to a breather port of an engine or an air passage for feeding air to a carburettor. In the pipe member as illustrated in FIGS. 12 and 13, the passages 218 and 218 defined by the upper and lower portions 210 and 210 of the closed section shape may be used as an air passage for feeding air and a breather chamber, respectively.

It is noted that while the pipe member 208 has been described as being applied to the main frame 204, it may be used as a down-tube 206 with the open portion 222 being open at a position facing the center or rear side of the body.

According to the embodiment as explained in the foregoing, wiring and piping members can be supported on the frame without having any adverse influence upon the appearance of the body. Assembling effected through the open portion of the open-section portion leads to improvements in workability and provides protection of wiring and piping members with improved maintenance.

The third embodiment of the present invention will now be explained with reference to FIGS. 14 to 20 inclusive.

According to this embodiment, it is utilized as the breather chamber for an engine the interior of a pipe forming a part of the body frame of an automatic two- or three-wheeled vehicle. More specifically, this embodiment has for its object to provide a breather structure for an engine, which assures a sufficient breather chamber volume, produces an improved oil separation effect and dispenses with any provision of a breather chamber on the engine side, leading to simplication of the engine structure.

Figure 14:
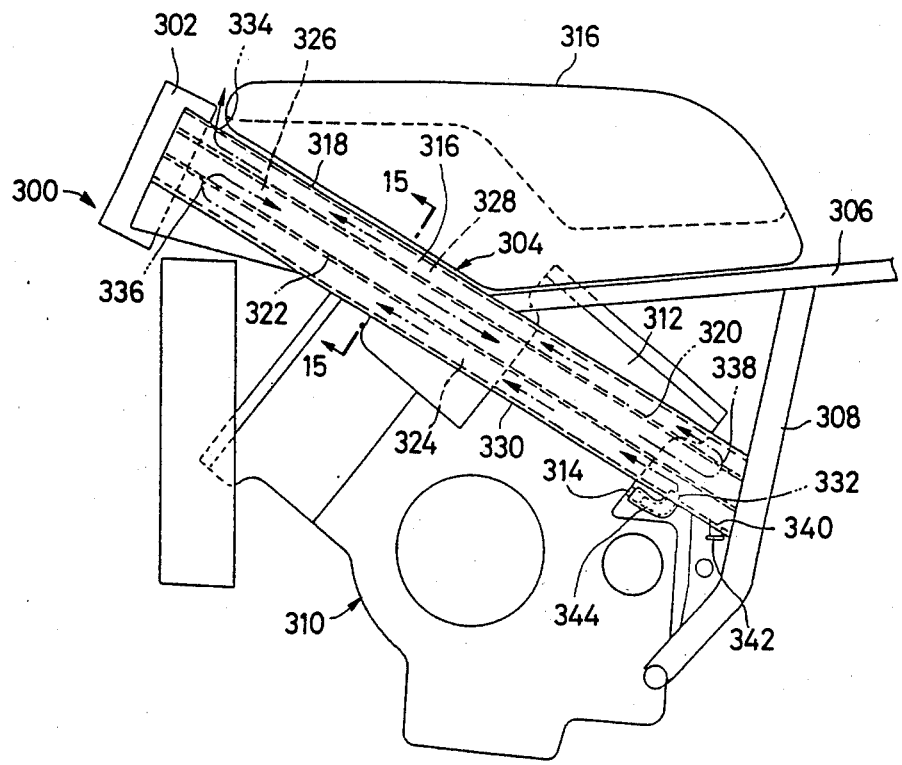
FIGS. 14 to 20 show together the third embodiment of the present invention.

FIG. 14 is a side view of the front portion of the body frame of an automatic two-wheeled vehicle or motorcycle. A body frame of the backbone type, generally shown at 300, includes a pair of main pipes 304 coupled at front ends to a head pipe 302. The main pipe 304 extends downwardly at a given angle, and is coupled at its intermediate portion with a rearwardly extending seat rail 306. A subpipe 308 is then coupled at its intermediate portion with the main pipes 304, and is connected at its upper end with the seat rail 306.

By suitable means, an engine 310 is mounted in place in a space defined between and below the main pipes 304 and 304. In this embodiment, use is made of an engine of the V-shaped type, as viewed sideways. A rearwardly inclining rear cylinder 312 is located between the rear end portions of the pair of main pipes 304, and is provided with a breather pipe 314 at the lower portion of the rear wall thereof. It is noted that reference numeral 316 stands for a fuel tank.

Figure 15:
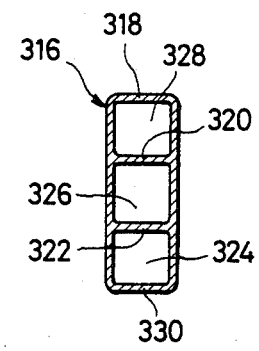

For at least a portion of such a body frame 300, for instance, the main frame 304, a pipe member 316 is used, which is of the section shape as illustrated in FIG. 15.

As illustrated in FIG. 15, the pipe member 316 is of the closed section shape having a longitudinal width larger than a lateral width, and is provided therein with patition walls 320 and 322 in parallel with an upper wall 318 thereof and in the longitudinal direction to define three gas-liquid separation chambers comprising a first or lower passage 324, a second or intermediate passage 326 and a third or upper passage 328.

Such a main frame 304 is proivded with a gas intake port 332 in the vicinity of the rear end of its lower wall 330 and a gas discharge or exhaust port 334 at the front portion of its upper wall 318, and communication openings 336 and 338 are respectively formed in the front portion of the partition wall 322 between the first and second passages 324 and 326 and the rear portion of the partition wall 320 between the second and third passages 326 and 328. Further, a drain port 340 is provided in the rear end of the lower wall 330, and receives threadedly a bolt 342.

The breather pipe 314 is then connected to the gas intake port 332 by means of a connecting tube 344 to communicate the interior of the engine 310 within the main frame 304.

Referring to the gas-liquid separation chamber arrangement defined in the main pipe frame 304, which comprises the upper, intermediate and lower chambers disposed in a labylinthine state, a discharged gas containing an oily component first enters the rear portion of the first passage 324 from the gas intake port 322 through the breather pipe 314 and the connecting tube 344, flows forwardly as indicated by an arrow in FIG. 14, and enters the front portion of the second passage 326 through the communication opening 336. In that passage, a substantial part of a liquid component composed mainly of oil is separated from the discharged gas by deposition to the inner wall of the first passage which is relatively long, and flows downwardly to the rearmost portion, i.e., the lowermost portion along the lower wall 330 of the main pipe frame 304.

On the other hand, an amount of gas from which the oil has been separated flows rearwardly through the second passage 326 from the front portion thereof, and again flows forwardly for discharging into the air.

In this manner, the interior of the main frame 304 can be allowed to function as an oil catch tank. It is noted that an amount of oil captured within the first passage 324 defined within the main frame 304 is drained off by removing the bolt 342 from the drain port 340.

Figure 16:
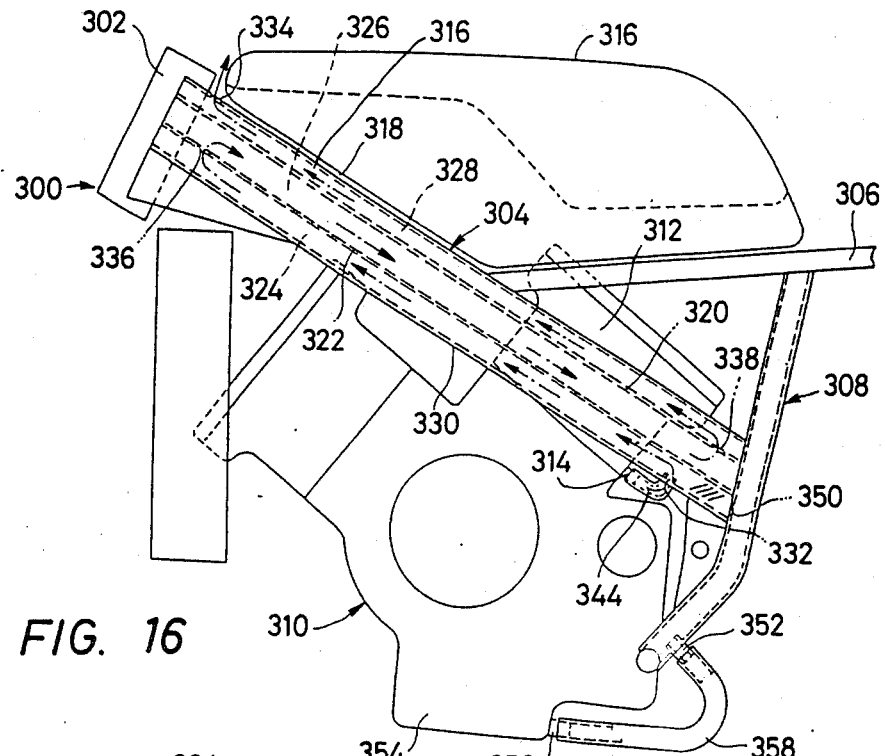

FIG. 16 is an embodiment having an oil return function. In this embodiment, a drain port 350 is provided in the wall of the subpipe 308 which the rear end of the first passage 324 is located, and a drain pipe 352 is provided on the lower portion of the subpipe 308.

A return pipe 356 is provided on the lower portion of a crank case 354 of the engine 310, and a return tube 358 is used to connect the return pipe 356 to the drain pipe 352, thereby allowing the interior of the engine 310 to communicate within the subpipe 308.

An amount of oil captured in this manner is returned into the engine for re-use.

Figure 17:
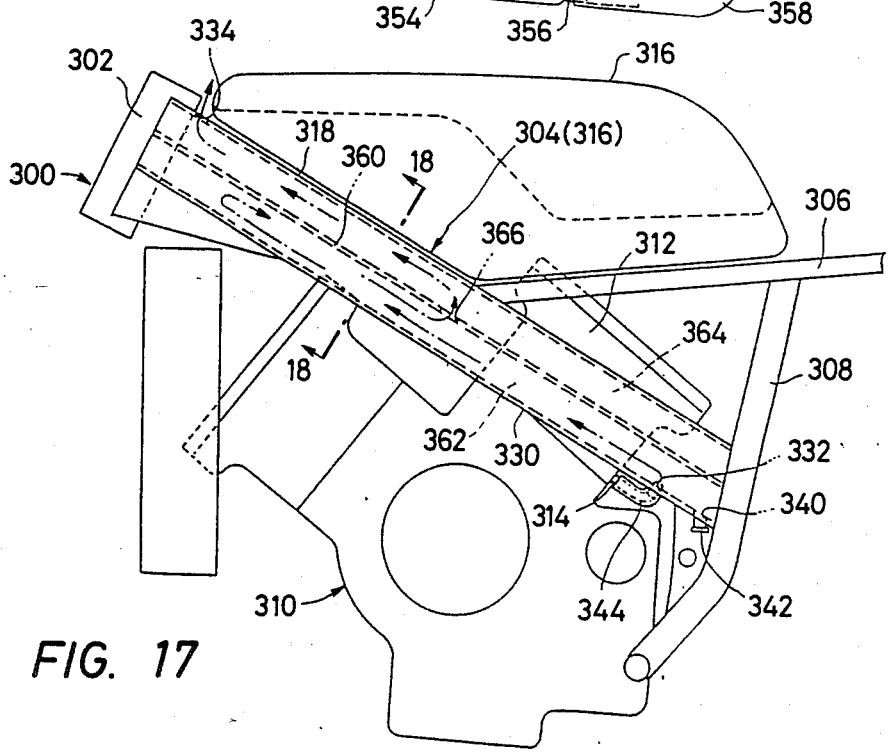
Figure 18:
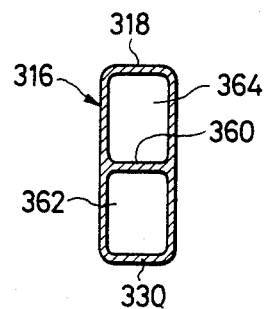
Figure 19:
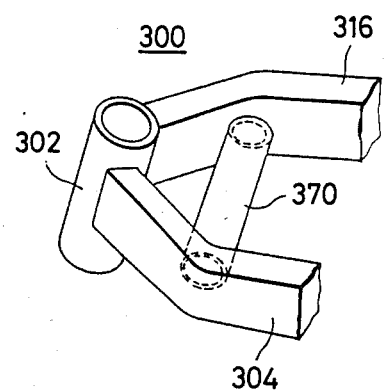
Figure 20:
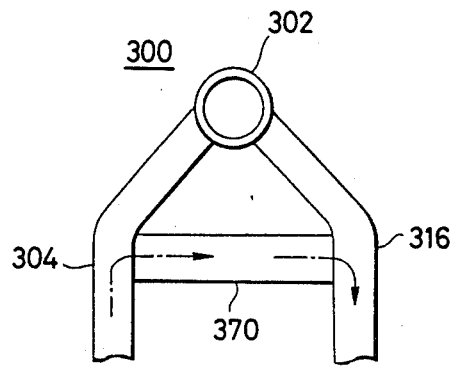

While the foregoing embodiment has been described as including three gas-liquid seaparation chambers, it is also possible to provide upper and lower passages by a single partition wall 360, as illustrated in Figs. 17 and 18. A communication opening 366 is provided in the intermediate portion of the partition wall 360 for defining the first or lower passage 362 and the second or upper passage 364.

As indicated by an arrow in FIG. 17, a discharged gas flows forwardly through the first passage 362, and reaches the front end thereof, from which it returns to the intermediate portion thereof, and enters the second passage 364 through the comminication opening 366. The oil separation effect within the first passage 362 is further enhanced due to mutual interference caused by the U-turn of a gas flow.

After oil separation has taken place, an amount of gas entering the intermediate portion of the second passage 364 is discharged into the air through the front discharge port 334.

Referring further to the embodiment shown in FIGS. 14 to 18, a cross-pipe 370 is laid between the front ends of the pair of main pipe frames 304 and 304. If communication is made between the interiors of the frames 304 and 304 by this cross-pipe 370, further extension of the breather passages would then be achieved to further enhance the gas-liquid separation effect. It is understood that while the foregoing embodiment has been described as being applied to a motorcycle, it may be applied to saddle type vehicles such as automatic three-wheeled vehicles and other vehicles. It should be understood that this embodiment is applicable not only to the main frames but also other frame members of the body frame, and no particular limitation is imposed upon the labyrinthine structure and the shape of the chambers defined.

In the above-mentioned embodiment wherein the labyrinthine passage breeding the engine is defined within the pipe member forming a part of the body frame of an automatic two- or three-wheeled vehicle in particular, it is unnecessary to provide any breather chamber on the engine side. Consequently, the structure of the engine is simplified, and the pipe member of a large volume is used as the breather chamber, thus leading to further enhancement of the oil separation effect.

Reference will now be made to the fourth embodiment of the present invention, shown in FIGS. 21, 22 and 23.

Figure 21:
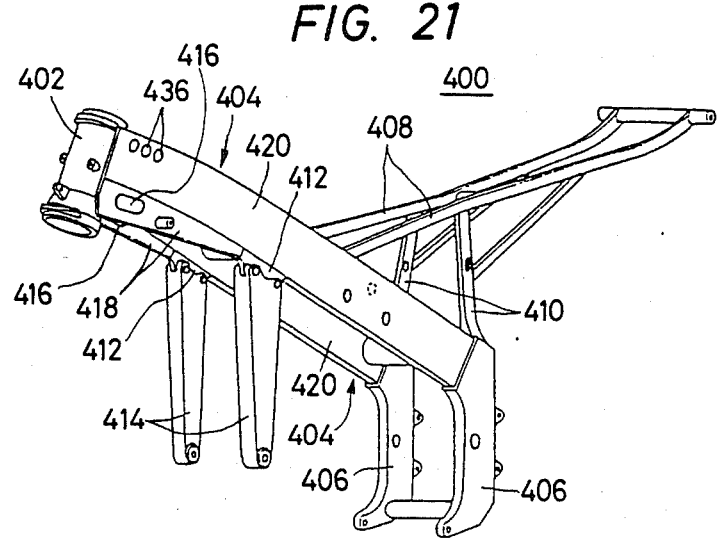
FIGS. 21 to 23 show together the fourth embodiment of the present invention.

FIG. 21 is a perspective view of a body frame. A body frame of the backbone type, generally shown at 400, includes a pair of main frames 404 and 404 fixed at their front ends to a head pipe 402. The pair of main frames 404 and 404, inclining, extend toward the rear portion of a body at a given increasing interval, and are fixedly provided with a pair of pivot plates 406 and 406 at both rear ends.

A pair of seat rails 408 and 408 are fixed at their front ends to the upper faces of the substantially central portion of the pair of main frames 404 and 404, and are supported at their rear ends by seat gusset plates 410 and 410 provided on the upper portion of the pivot plates 406 and 406.

Engine hanger brackets 412 and 412 are provided on the uderfaces of the substantially central portion of the pair of main frames 404 and 404, and an engine is mounted in place by engine hangers 414 and 414 connected to the brackets 412 and 412 and the pivot plates 406 and 406. Head pipe gussets 418 and 418 formed therein with oval openings 416 and 416 are fixedly provided to the lower portion of parts of the main frames 404 and 404 between the head pipe 402 and the engine hanger brackets 412, 412.

Figure 22:
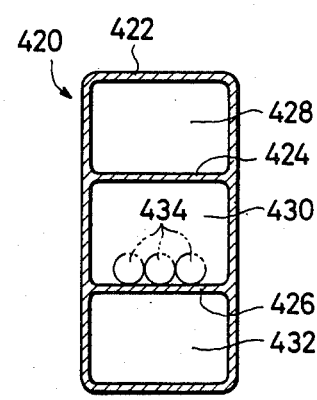

For at least a portion of the body frame 400, for instance, the main frame 404, a pipe member 420 is used, which of the such a sectional shape as illustrated in FIG. 22.

As illustrated in FIG. 22, the pipe member 420 is of the closed section shape having a longitudinal width larger than a lateral width, and is therein provided with partition walls 424 and 426 in parallel with an upper wall 422 thereof and in the longitudinal direction to divide the interior of the pipe member 420 into upper, intermediate and lower passages 428, 430 and 432.

The upper, intermediate and lower passages 428, 430 and 432 are respectively designed to be used as an air passage for feeding air to a carburettor, a passage for the insertion of cables and a breather catch tank.

The upper passage 428 providing the air feeding passage is provided with a plurality of small openings in the outer side of the front end in the vicinity of the head pipe 402, said small openings defining together an air intake port 436, and is provided at the rear end with an outlet to be connected to an air cleaner through a hose. The intermediate passage 430 providing the passage for cables 434 receives cables 434 such as control cables for an operating lever mounted on the handlebar and wire harness for various lamps and switches in the following manner. The cables 434 are inserted through the insertion opening 416 in each head pipe gusset 418 in between the main frames 404 and 404, and are then advanced into the intermediate passage 430 through an inlet formed in the side wall thereof for wiring toward the rear portion of the body. The lower passage 432 providing the breather catch tank is formed into a closed chamber closed at both its ends, and is designed to store a variable pressure in a crank chamber to which it is connected through a breather tube and an amount of gasoline leaving the fuel tank. A certain amount of gas and liquid stored is discharged by removing a drain bolt threadedly fitted into the lower end portion of the passage 432.

Figure 23:
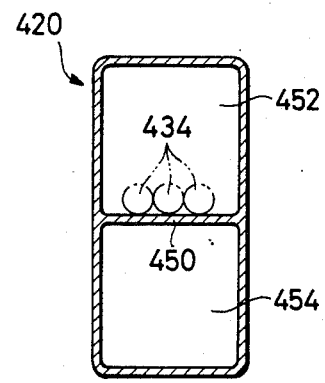

It is noted that while the foregoing embodiment has been described as dividing the interior of the pipe member 420 into three passages, the interior of that pipe may be divided into two passages, as illustrated in FIG. 23.

More specifically, a single partition wall 450 is provided for dividing the interior of the pipe member 420 into upper and lower passages 420 and 452.

In this case, the upper passage 452 provides a combination of an air passage for feeding air to a carburettor with a passage for the insertion of various cables 434, and the lower passages 454 provides a breather catch tank.

Alternatively, the upper passage 452 may be used as the air passage, while the lower passage 454 may be applied as the cable insertion passage. Still alternatively, the upper passage 452 may be used as the air-feeding passage, while the lower passage 454 may be applied as the breather tank. Still alternatively, the upper passage 454 may be used as the cable insertion passage, while the lower passage 454 may be applied as the breather catch tank.

It is noted that, in the aforesaid both embodiments, the side wall surface of the passage for inserting the cables 434 may be provided with such elongated openings as illustrated in FIG. 2. As is the case with the first embodiment, the provision of such openings 168, 170 and 172 makes it possible to lock the cables together on the side wall of that passage by means of a suitable fastener.

According to the embodiment as mentioned above, differently functioning passages for feeding air to a carburetto, for inserting various cables and for other purpose are defined in a pair of main frames each including passages defined by partition walls. Consequently, the passages within the main frames rames are protected from the outside. Further, any space for wiring and piping are not required between both main frames, so that other parts can freely be disposed in place, thus resulting in a reduction in the size of the body.

While the foregoing embodiments have been described as being applied to the body frame of a motorcycle in particular, the present invention may be applied to the body frames of saddle type vehicles such as automatic three-wheeled vehicles and other vehicles.

We claim:

1. A body frame structure for a saddle type motor vehicle comprising a head pipe and
   a pair of main frame pipe members extending rearwardly from and attached at their front end to said head pipe,
   at least one of said main frame pipe members having therein a longitudinally extending partition wall dividing said frame pipe member into a plurality of passages, each such passage forming a hollow section, said plurality of passages including at least one passage closed at its opposite ends and having an inlet and an outlet, and at least one passage for wiring cables, including control cables, and a wire harness, said wiring passage being closed at its opposite ends and having openings along one wall, said cables being clamped to said partition wall adjacent said openings by a fastener means.

2. A body frame structure for a saddle type vehicle as recited in claim 1, wherein said fastener means are locked to said main frame at said main frame ends.

3. A body frame structure for a saddle type vehicle as recited in claim 1, wherein said fastener means are locked to the inner face of lip portions formed by a bent in inner edge at said openings along said one wall.

4. A body frame structure for a saddle type motor vehicle as recited in claim 1, wherein said openings along said one wall are disposed at position facing the center of said body frame.

5. A body frame structure for a saddle type motor vehicle as recited in claim 1, wherein said openings along said one wall are disposed at position facing the lower portion of said body frame.

6. A body frame structure for a saddle type motor vehicle as recited in claim 1 wherein said openings along said one wall are disposed at position facing the center and lower portions of said body frame.

7. A body frame structure for a saddle type motor vehicle as recited in claim 1, wherein said one passage having an inlet and an outlet breather port of the vehicle engine to form a breather chamber.

8. A body frame structure for a saddle type motor vehicle as recited in claim 7, wherein said one passage has a plurality of longitudinal extending partition walls forming a plurality of passages communicating with each other and forming a labyrinthine breather.

9. A body frame structure for a saddle type motor vehicle as recited in claim 8, wherein said plurality of passages communicate with each other through a cross pipe.

10. A body frame structure for a saddle type motor vehicle as recited in claim 1, wherein said one passage having an inlet and an outlet is an air passage for feeding air to a carburetor.

11. A body frame structure for a saddle type motor vehicle as recited in claim 1, wherein said one passage has a plurality of longitudinally extending partition walls forming a plurality of passages, one passage for feeding air to the carburetor and another passage which acts as a breather chamber connected with the breather port of the vehicle engine.

12. A body frame structure for an automobile vehicles as defined in claim 1, wherein one of said pair of main frame pipe members acts as both an air passage for a carburetor and a passage for cables.

* * * * *